(12) United States Patent
Sun et al.

(10) Patent No.: US 8,073,051 B2
(45) Date of Patent: Dec. 6, 2011

(54) METHOD AND RELATED DEVICE FOR CONVERTING TRANSPORT STREAM INTO FILE

(75) Inventors: Sheng-Nan Sun, Hsinchu County (TW); Chi-Tung Lin, Taipei County (TW); Pao-Jen Chen, Hsinchu (TW); Chiao-Lin Wu, Taoyuan County (TW); Cheng-Chien Kao, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 811 days.

(21) Appl. No.: 12/173,821

(22) Filed: Jul. 16, 2008

(65) Prior Publication Data

US 2009/0213924 A1 Aug. 27, 2009

(30) Foreign Application Priority Data

Feb. 22, 2008 (TW) .............................. 97106252 A

(51) Int. Cl.
*H04N 7/12* (2006.01)
(52) U.S. Cl. .............................. 375/240.01; 375/240.26
(58) Field of Classification Search ........................ None
See application file for complete search history.

(56) References Cited

U.S. PATENT DOCUMENTS

| | | | |
|---|---|---|---|
| 6,404,818 B1 * | 6/2002 | Obikane | 375/240.28 |
| 6,798,980 B1 | 9/2004 | Seo | |
| 7,656,947 B2 * | 2/2010 | Seo et al. | 375/240 |
| 2004/0252771 A1 * | 12/2004 | Oishi | 375/240.26 |
| 2005/0069289 A1 | 3/2005 | Kusunoki | |
| 2006/0215707 A1 | 9/2006 | Tsai et al. | |
| 2007/0002166 A1 * | 1/2007 | Eklund et al. | 348/386.1 |
| 2007/0076798 A1 * | 4/2007 | Imahashi et al. | 375/240.24 |
| 2007/0081587 A1 | 4/2007 | Raveendran | |
| 2007/0133693 A1 * | 6/2007 | Gan et al. | 375/240.26 |
| 2007/0271492 A1 | 11/2007 | Yahata | |
| 2008/0152020 A1 * | 6/2008 | Kayashima et al. | 375/240.28 |

FOREIGN PATENT DOCUMENTS

| | | |
|---|---|---|
| CN | 1838771 A | 9/2006 |
| JP | 2000333104 A | 11/2000 |
| TW | 200635373 | 10/2006 |

OTHER PUBLICATIONS

Zhang, Design and Implementation of Subtitle Decoder in Digital TV Set Top Box of DVB, China Digital Cable TV, Sep. 10, 2006, P1661/1701-1704, 2006 vol. 17, Abstract.

* cited by examiner

*Primary Examiner* — Hong Cho
(74) *Attorney, Agent, or Firm* — Winston Hsu; Scott Margo

(57) ABSTRACT

A method of converting format from a transport stream (TS) to a file for storing television program data carried by the transport stream includes steps of receiving a transport stream, performing filtering and depacketizing process for the transport stream to generate a plurality of elementary streams (ES) and presentation time stamps (PTS) corresponding to each data unit of the plurality of elementary streams according to packet identifiers (PID) of television programs being recorded, and converting the plurality of elementary streams to a file according to the presentation time stamps.

27 Claims, 5 Drawing Sheets

METHOD AND RELATED DEVICE FOR CONVERTING TRANSPORT STREAM INTO FILE

BACKGROUND OF THE INVENTION

1. Field of the Invention

The present invention relates to a method and related device for storing digital television program data, and more particularly, to a method and related device for converting a transport stream carrying digital television program data to a file.

2. Description of the Prior Art

With the popularity of digital TV, demands on set-top boxes (STBs) or other digital TV reception devices are increasing. Generally, a digital TV reception device is mainly used for performing operations like filtering, demodulation, demultiplexing, decompression, etc. on received digital TV signals, so as to rebuild digital TV programs broadcasted by TV stations for the users.

As well-known in the art, digital TV data is carried by a transport stream (TS) defined in an MPEG-2 video compression standard. Please refer to FIG. 1, which illustrates how a conventional transport stream is formed. According to definitions of the MPEG-2 standard, original audio and/or video digital signals are respectively encoded by MPEG-2 encoders to form video and/or audio elementary streams (ES). In addition to the audio and video signals, some sorts of data, such as teletext information, subtitles or other private data that is necessary for digital TV programs, also forms a data elementary stream. However, these elementary streams cannot be transmitted or stored directly, but have to be forwarded into a packetizer for being packetized to form Packetized Elementary Streams (PES) first. In other words, the packetized elementary streams are formed by segmenting continuous elementary streams into packets for facilitating transmission, wherein the packets in the packetized elementary streams are utilized for carrying access units of the elementary streams, which is also defined in the MPEG-2 standard and not narrated herein.

Finally, the packetized elementary streams (including a video PES and an audio PES) are multiplexed by a multiplexer into a program stream (PS) or a transport stream (TS) for being stored or transmitted. The PS and TS formats are both defined for transmission in the MPEG-2 standard. However, since the size of the PS packet is not fixed, the PS format is preferred for use in a storage medium where errors rarely occur, such as DVD discs. Conversely, the TS format utilizes fixed-size packets, which not only makes it much easier for hardware to process the data, but is also more suitable for performing error correction. Therefore, the TS format is mainly utilized for transmission where errors easily occur, such as IEEE 1394 protocol or digital video broadcasting (DVB).

Each TS packet occupies 188 bytes, wherein the first 4 bytes are a header and the payload after the header is data of a PES packet. Each header of the TS packet has a field for storing a packet identifier (PID) and clock information. The PID is utilized for identifying packets that belong to the same data stream, so that a digital TV reception device such as a set-top box can retrieve a PES with the same PID from a TS accordingly. For example, a TS usually includes at least an audio PES and a video PES, in which packets of the audio PES can be identified by a specific audio PID, and similarly, packets of the video PES can be identified by a specific video PID.

Briefly speaking, the ES, which can be an audio ES or a video ES, is program data encoded after being compressed by the MPEG-2 standard. The PES is formed of packets by segmenting a continuous ES data stream and inserting packet headers. The TS is practically a stream format for transmission in the MPEG-2 standard, and includes a series of TS packets composed from various TV programs. The PS is also a stream format for transmission in the MPEG-2 standard, but only includes packets composed from a single TV program.

When the digital TV signal transmitted in the TS format is received by the digital TV reception device, recording of TV programs carried in the TS can be roughly divided into two kinds. One is to record the received digital TV signal in the TS format directly, on a hard disc for example. However, the TS recorded in the hard disc is hard to modify or manage, and data quantity of the TS is quite large (since there exists various TV programs in the TS), so that finite capacity of the hard disc becomes an issue of this method. The other way is performing filtering and MPEG-2 decoding operations for the received TS to retrieve desired TV program data. Then, the retrieved TV program data is further encoded into the PS format, so as to reduce the size of stored data. However, a set of MPEG-2 decoding/encoding (codec) systems needs to be implemented, resulting in the increase in cost and complexity of the whole system.

In addition, a method of converting a TS to a PS is disclosed in US patent publication No. US20060215707, entitled "System and Method for Stream Format Conversion," in which corresponding PES or ES are retrieved from the TS and are multiplexed to form a PS directly, so as to avoid the use of the MPEG-2 codec system. Although the codec system is eliminated, the TV program data being stored is limited to the PS format, so format conversion has to be performed when the TV program data is transferred for play on other devices, which causes significant inconvenience of use.

SUMMARY OF THE INVENTION

It is therefore an objective of the present invention to provide a method and related device for converting a transport stream into a file.

According to the present invention, a method of converting a transport stream into a file for storing television program data carried by the transport stream is disclosed. The method includes steps of receiving the transport stream, performing filtering and depacketizing processes for the transport stream to generate a plurality of Elementary Streams (ES) and Presentation Time Stamps (PTS) corresponding to each data unit of the plurality of elementary streams according to a plurality of packet identifiers (PID) of television programs being stored, and converting the plurality of elementary streams to the file according to the presentation time stamps.

According to the present invention, an electronic device of converting a transport stream into a file for storing television program data carried by the transport stream is further disclosed. The electronic device includes a reception terminal, a filtering unit, a file wrapping unit and an output terminal. The reception terminal is utilized for receiving the transport stream. The filtering unit is coupled to the reception terminal, and is utilized for performing filtering and depacketizing processes for the transport stream to generate a plurality of Elementary Streams (ES) and Presentation Time Stamps (PTS) corresponding to each data unit of the plurality of elementary streams according to a plurality of packet identifiers (PID) of television programs being stored. The file wrapping unit is coupled to the filtering unit, and is utilized for converting the plurality of elementary streams to the file according to the presentation time stamps. The output terminal is coupled to the file wrapping unit, and is utilized for outputting the file.

According to the present invention, a digital television reception device having a television recording function is further disclosed. The digital television reception device includes a television receiver for receiving a digital television signal to generate a transport stream; a stream to file converter, coupled to the television receiver, for converting the transport stream to a file for storing television program data carried by the transport stream; and a file storage device, coupled to the stream to file converter, for storing the file outputted by the stream to file converter. The stream to file converter further includes a filtering unit for performing filtering and depacketizing processes for the transport stream to generate a plurality of Elementary Streams (ES) and Presentation Time Stamps (PTS) corresponding to each data unit of the plurality of elementary streams according to a plurality of packet identifiers (PID) of television programs being stored; and a file wrapping unit for converting the plurality of elementary streams to the file according to the presentation time stamps.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
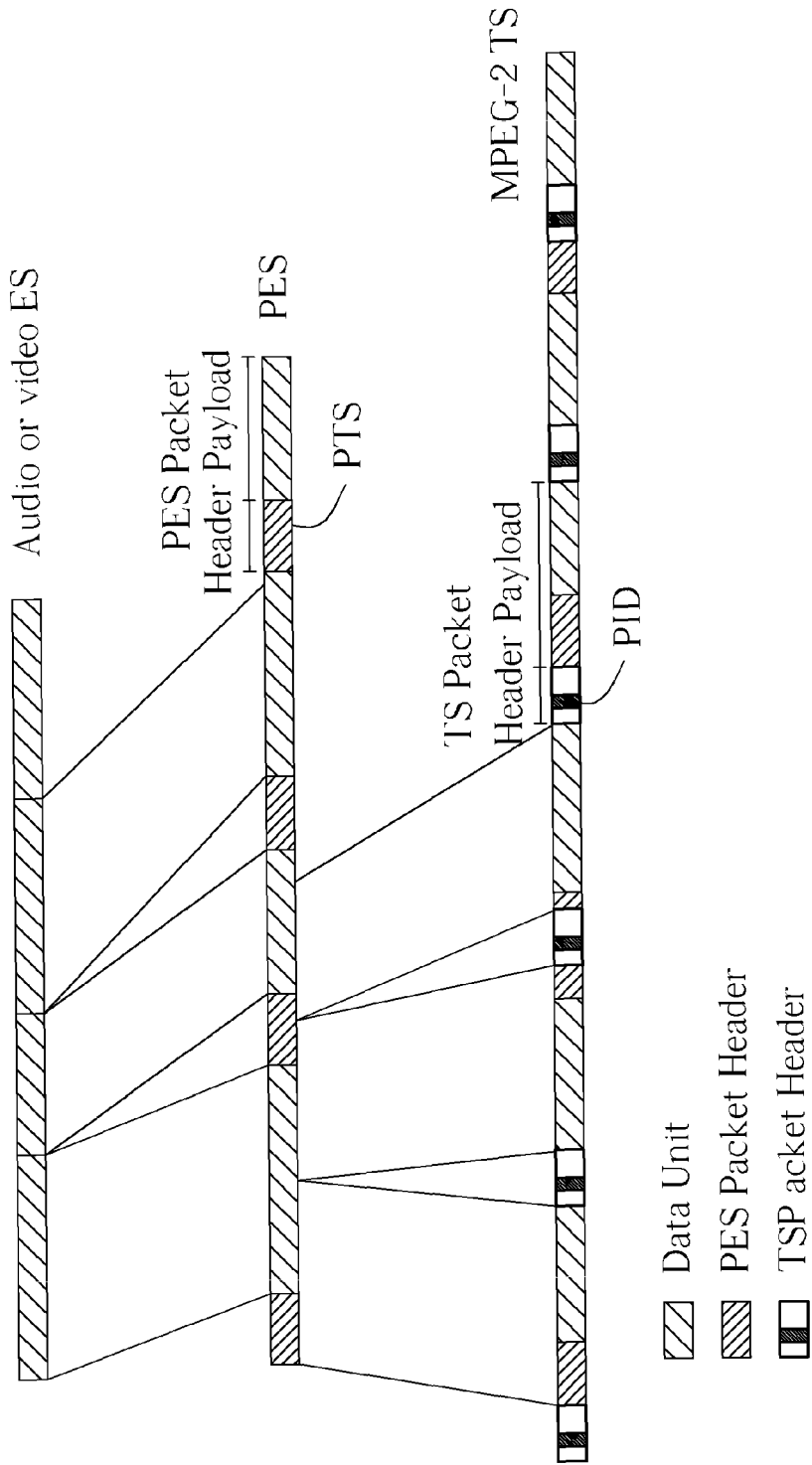
FIG. 1 illustrates how a conventional transport stream is formed.
Figure 2:
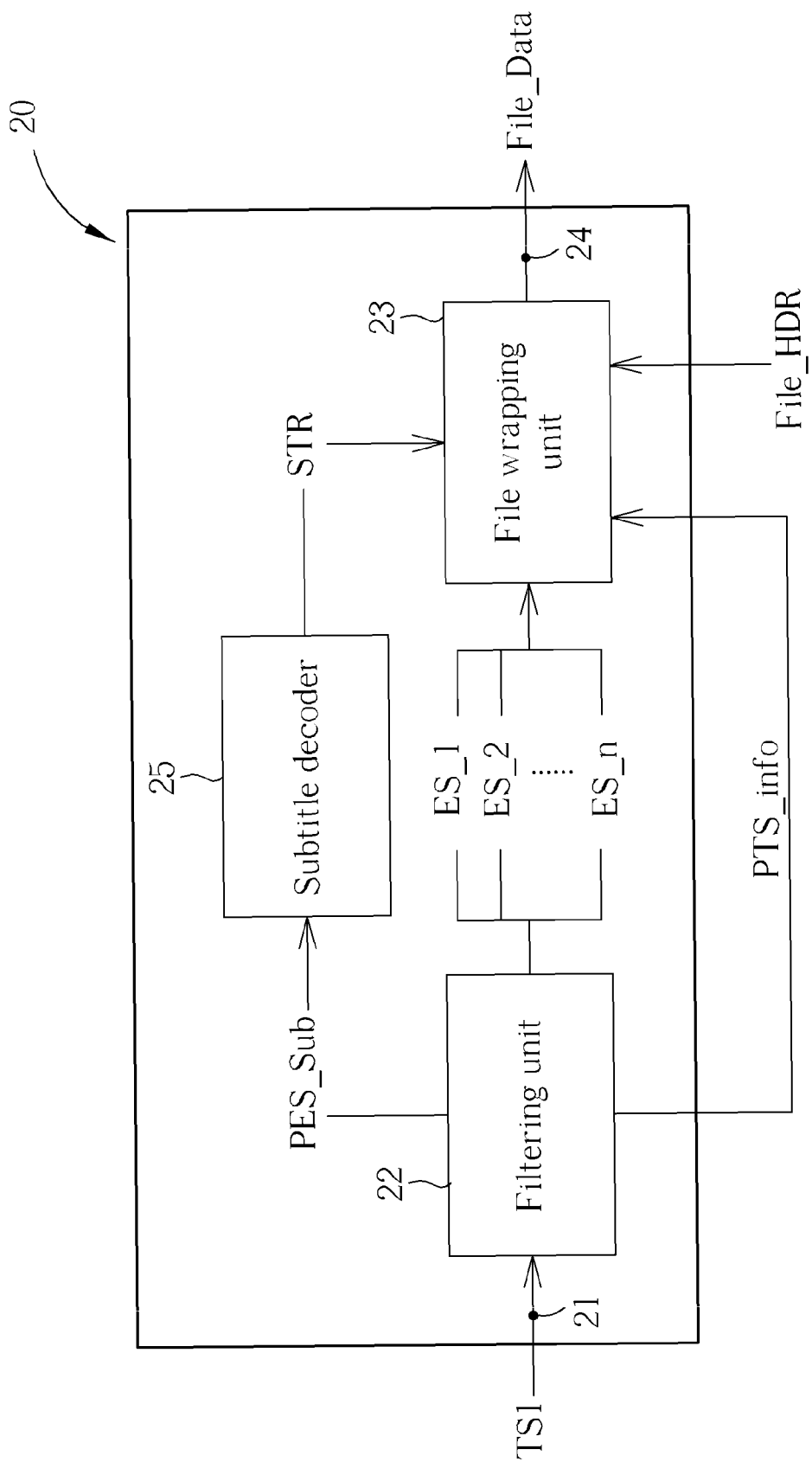
FIG. 2 is a schematic diagram of an electronic device for converting format from a transport stream to a file according to an embodiment of the present invention.

Please refer to FIG. 2. FIG. 2 is a schematic diagram of an electronic device 20 for converting format from a transport stream to a file according to an embodiment of the present invention. The electronic device 20 is utilized for converting a transport stream into a file to store TV program data carried by the transport stream. The electronic device 20 includes a reception terminal 21, a filtering unit 22, a file wrapping unit 23 and an output terminal 24. The reception terminal 21 is utilized for receiving a transport stream TS1. The filtering unit 22 is coupled to the reception terminal 21, and is utilized for performing filtering and depacketizing processes on the transport stream TS1 according to packet identifiers (PID) of television programs to be stored to generate Elementary Streams (ES) ES_1~ES_n and Presentation Time Stamps (PTS) PTS_Info corresponding to each data unit in the elementary streams ES_1~ES_n. The file wrapping unit 23 is coupled to the filtering unit 22, and is utilized for sorting data units in the elementary streams ES_1~ES_n according to the presentation time stamps PTS_Info to generate data payloads. In addition, the file wrapping unit 23 generates (or receives) a file header FILE_HDR and corresponding frame headers according to a selected file format. The output terminal 24 is coupled to the file wrapping unit 23, and is utilized for outputting the file header, the data payloads, and the corresponding frame headers to form file data File_Data of a file.

Basically, TV program data is composed of images and sounds, and thus the elementary streams ES_1~ES_n at least include a video elementary stream and an audio elementary stream. Preferably, the filtering unit 22 can further generate a subtitle Packetized Elementary Stream (PES) PES_sub corresponding to the elementary streams ES_1~ES_n by filtering the transport stream TS1. In this case, the electronic device 20 of the present invention further includes a subtitle decoder 25, coupled to the filtering unit 22, for decoding the subtitle packetized elementary stream PES_sub to generate a corresponding string STR, so that the string STR can be multiplexed into the data payloads by the file wrapping unit 23 according to the presentation time stamps PTS_info. In addition, a file header generator (not shown in FIG. 2) can be further included, which is utilized for generating the file header FILE_HDR and the corresponding frame headers according to a file format selected by users and related configurations. The file format is preferred to be a multimedia container file format, such as Audio Video Interleaving (AVI), Advanced Systems Format (ASF) and Motion Picture Expert Group (MPEG), and not restricted herein.

Note that the presentation time stamps PTS_info are carried in headers of the packetized elementary streams, and thus can be obtained in the process of converting the transport stream to the elementary streams by the filtering unit 22. The related operations are illustrated in MPEG-2 specifications, and not described herein. On the other hand, since the presentation time stamps PTS_info represent presentation time of each data unit in the elementary streams, the data units in the elementary streams ES_1~ES_n can thus be sorted by the presentation time stamps PTS_info to synchronize audio and video data recorded in the file of the present invention.

That means, after the elementary streams ES_1~ES_n corresponding to the TV program being recorded are generated by the filtering unit 22, the electronic device 20 further generates the file header FILE_HDR and the corresponding frame headers according to a selected file format, and sorts the data units in the elementary streams ES_1~ES_n to generate payloads conforming to the selected file format according to the presentation time stamps PTS_info. Finally, the file header FILE_HDR, the data payloads and the corresponding frame headers are outputted to be the file through the output terminal 24. Therefore, when the users want to store digital TV program data, such as the TV programs, TV program data carried in a transport stream can be directly outputted to be a file in the present invention, so as to avoid complex steps in the prior art that convert the transport stream into files by performing MPEG-2 decoding in advance. In addition, since data stored in the file format can be easily transferred to play on other devices, convenience of use is greatly enhanced in the present invention.

Figure 3:
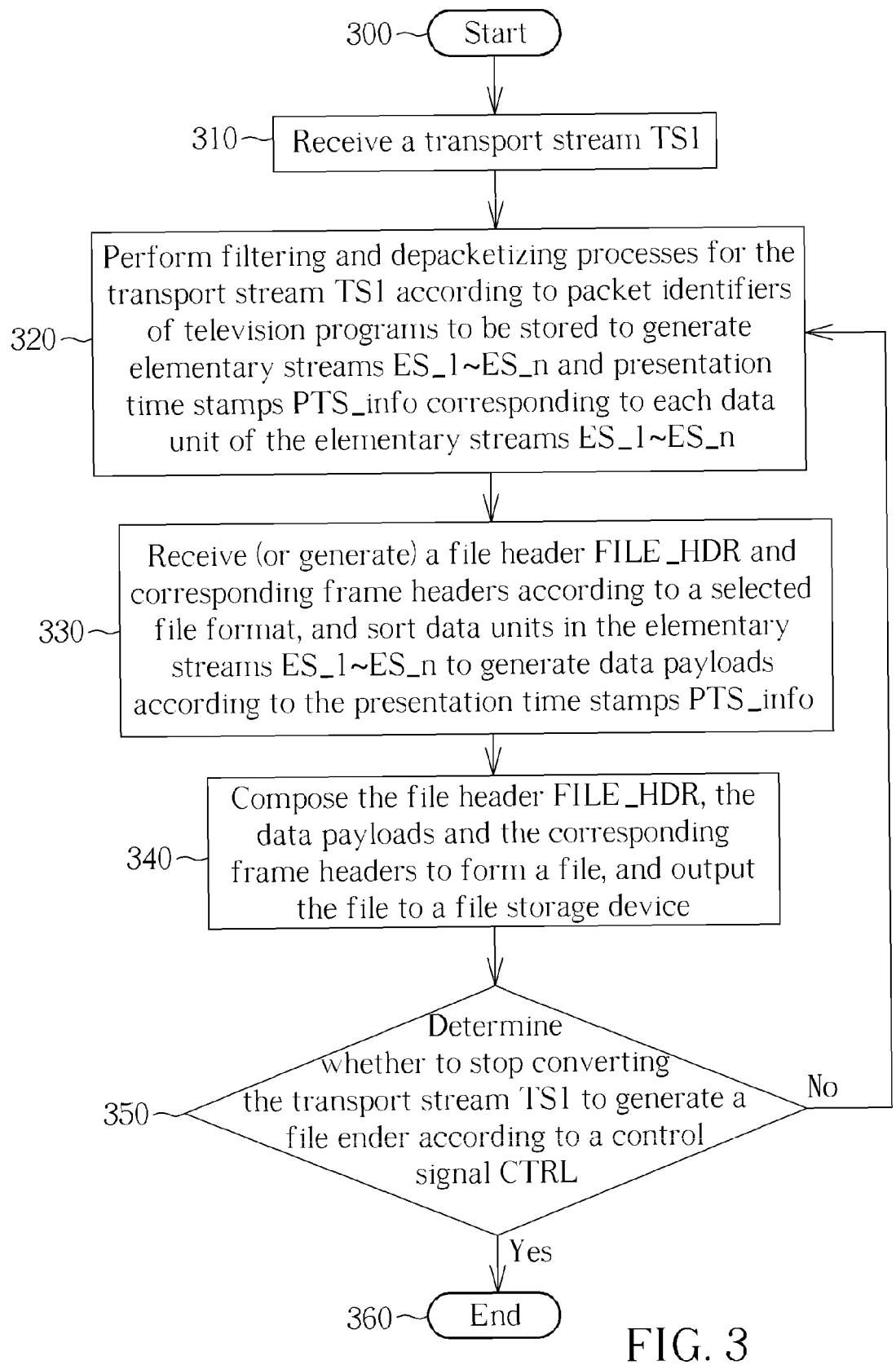
FIG. 3 is a schematic diagram of a process for converting format from a transport stream to a file according to an embodiment of the present invention.

As for the detailed operations of the electronic device 20, please refer to FIG. 3. FIG. 3 is a schematic diagram of a process 30 for converting format from a transport stream to a file according to an embodiment of the present invention. The process 30 is utilized for realizing the operations of the electronic device 20, and includes the following steps:

Step 300: Start.

Step 310: Receive a transport stream TS1.

Step 320: Perform filtering and depacketizing processes for the transport stream TS1 according to packet identifiers of television programs to be stored to generate elementary streams ES_1~ES_n and presentation time stamps PTS_info corresponding to each data unit of the elementary streams ES_1~ES_n.

Step 330: Receive (or generate) a file header FILE_HDR and corresponding frame headers according to a selected file format, and sort data units in the elementary streams ES_1~ES_n to generate data payloads according to the presentation time stamps PTS_info.

Step 340: Compose the file header FILE_HDR, the data payloads and the corresponding frame headers to form a file, and output the file to a file storage device.

Step 350: Determine whether to stop converting the transport stream TS1 to generate a file ender according to a control signal CTRL.

Step 360: End.

According to the process 30, the transport stream TS1 is first filtered and depacketized to generate the elementary streams ES_1~ES_n and presentation time stamps PTS_info corresponding to each data unit in the elementary streams ES_1~ES_n according to packet identifiers of television programs to be stored. Then, the file header FILE_HDR and the corresponding frame headers are generated according to a selected file format, and data units in the elementary streams ES_1~ES_n are sorted to generate data payloads according to the presentation time stamps PTS_info. Finally, the electronic device 20 outputs file data File_Data formed by the file header FILE_HDR, the data payloads and the corresponding frame headers to a file storage device successively, and determines whether to stop converting the transport stream TS1 to generate a file ender according to the control signal CTRL. The control signal CTRL can be triggered by the users or generated according to broadcast time of the TV programs.

Additionally, in Step 330, if there exists a subtitle packetized elementary stream PES_sub corresponding to the elementary streams ES_1~ES_n in the transport stream TS1, the subtitle packetized elementary stream PES_sub can be decoded to generate a corresponding string STR, which can further be multiplexed into corresponding data payloads according to the presentation time stamps PTS_info.

Figure 4:
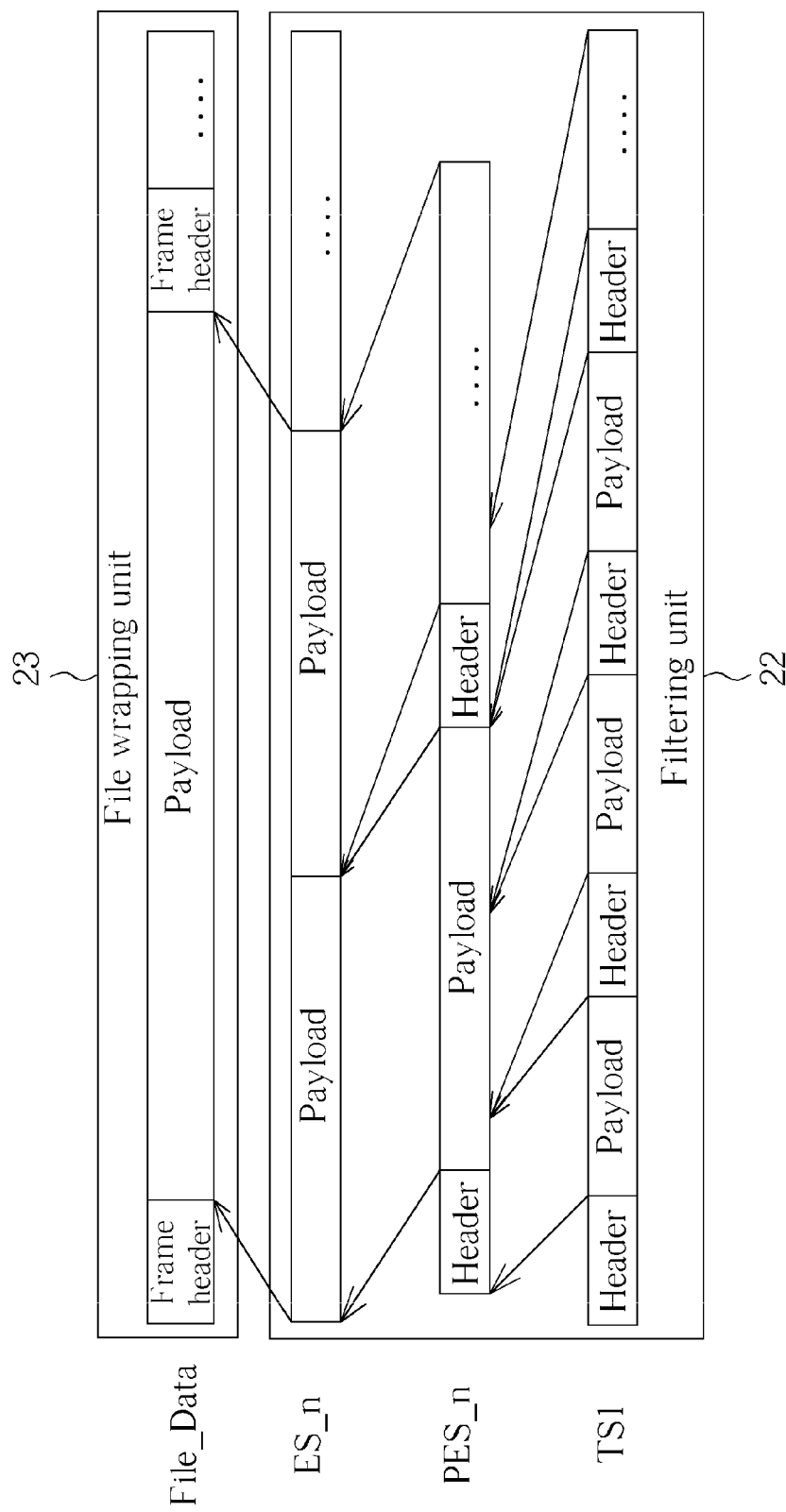
FIG. 4 illustrates how a transport stream is converted to a file according to an embodiment of the present invention.

Please refer to FIG. 4, which illustrates how a transport stream is converted to a file according to an embodiment of the present invention. In FIG. 4, TS1 represents a transport stream received by the electronic device 20; PES_n represents a packetized elementary stream retrieved from the transport stream TS1 by the filtering unit 22 according to a specific packet identifier PID_n, which can be a video packetized elementary stream, an audio packetized elementary stream or a subtitle packetized elementary stream; ES_n represents an elementary stream formed after the packetized elementary stream PES_n is depacketized by the filtering unit 22, which can be a video elementary stream or an audio elementary stream; and File_Data represents data payloads generated by sorting data units in the elementary stream ES_1~ES_n according to the presentation time stamps PTS_info and corresponding frame headers generated according to the selected file format by the file wrapping unit 23. As shown in FIG. 4, when the audio elementary stream and the video elementary stream are retrieved from the transport stream TS1 by the filtering unit 22, the file wrapping unit 23 generates the frame headers according to the selected file format, and sorts the data units in the elementary stream ES_1~ES_n to generate the data payloads according to the presentation time stamps PTS_info. Finally, the file header FILE_HDR, the data payloads and the corresponding frame headers are outputted to be data of the file File_Data through the output terminal 24, and are further stored into a file storage device.

For example, if the selected file format is AVI, the electronic device 20 can record information like decoder types corresponding to the stored data (e.g. MPEG-2 decoder) in the file header FILE_HDR and audio and video interleaving frequency, frame rate, frame size and bit rate in the frame headers, so as to interlace the data units of the audio and video elementary streams according to the presentation time stamps PTS_info. The related operations are well known by those skilled in the art, and not narrated herein.

Preferably, the file storage device of the present invention is a removable storage device like memory cards such as SD cards, mini-SD cards or CF cards in order to increase portability of the stored file. Please note that the above embodiment is merely an exemplary illustration but not a limitation of the present invention, and those skilled in the art can certainly make appropriate modifications according to practical demands. For example, the process 30 can further include a step of detecting the removable storage device for the electronic device 20 to determine whether the removable storage device is connected. In this case, when the removable storage device is detected, following operations of format conversions can then be performed. Such corresponding variations also belong to the scope of the present invention.

Figure 5:
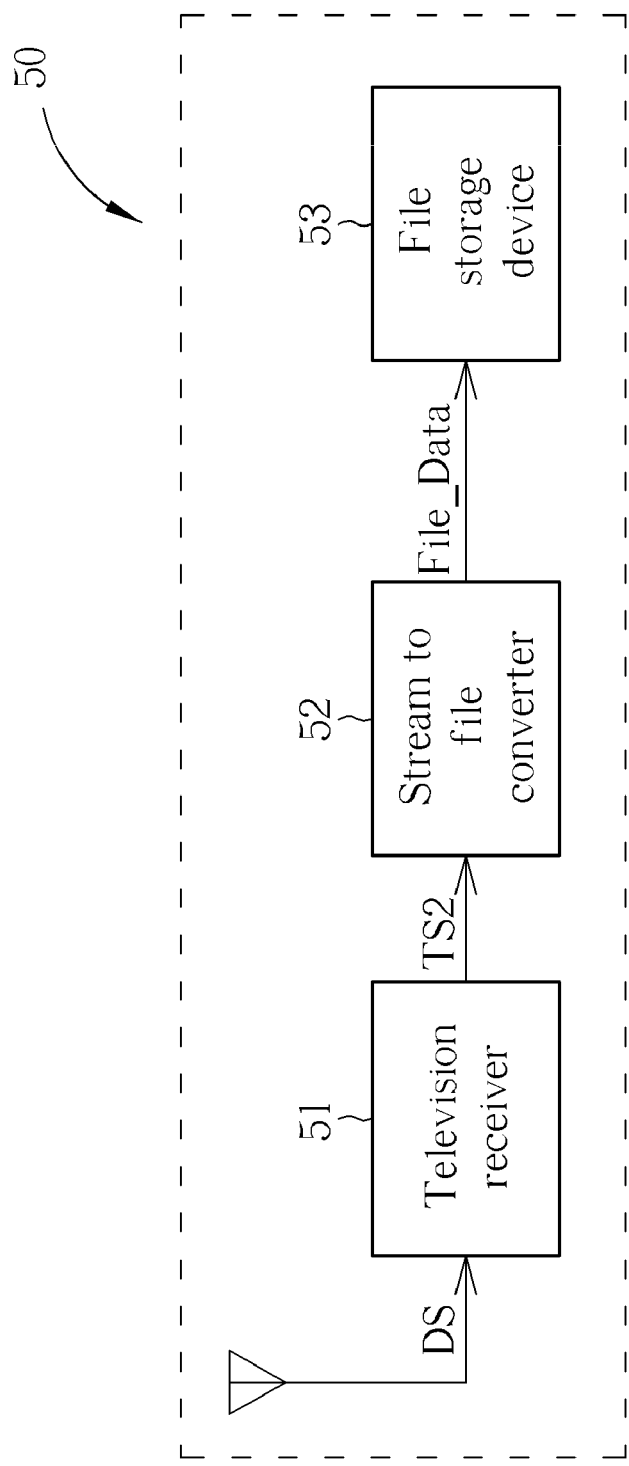
FIG. 5 is a schematic diagram of a digital television reception device with a television recording function according to an embodiment of the present invention.

In the present invention, the electronic device 20 can be further realized in a digital TV reception device, such as a set-top box or a digital TV, for outputting received digital TV as files and storing the files in a removable storage device. For example, please refer to FIG. 5. FIG. 5 is a schematic diagram of a digital television reception device 50 having a television recording function according to an embodiment of the present invention. The digital television reception device 50 includes a television receiver 51, a stream to file converter 52 and a file storage device 53. The television receiver 51 is utilized for receiving a digital television signal DS to generate a transport stream TS2. The stream to file converter 52 is coupled to the television receiver 51, and can be realized by the above electronic device 20 for converting the transport stream TS2 to a file, so as to store television program data carried by the transport stream TS2. The file storage device 53 is coupled to the stream to file converter 52, and is utilized for storing file data File_Data outputted by the stream to file converter 52.

Preferably, the digital television reception device 50 can further include a system clock, so that the recording function of the digital television reception device 50 can be activated at any predetermined time set by the users. Besides, the file storage device 53 is preferred to be a removable storage device. In this case, operations of detecting the file storage device have to be performed by the digital television reception device 50 in advance when the recording function is activated. If there exists no storage devices, format conversion cannot be operated.

Therefore, when the users want to store digital TV program data, such as the TV programs, TV program data carried in a transport stream can be directly outputted to be a file by the digital television reception device 50, so as to avoid complex steps in the prior art that convert the transport stream into files by performing MPEG-2 decoding in advance. In addition, compared with the prior art that can only output the program stream, file format data outputted by the digital television reception device 50 can be easily transferred to play on other devices, and convenience of use is greatly enhanced in the present invention.

As mentioned above, the present invention provides a method and related device for converting TV program data in the transport stream format to the file format and storing the converted file into the portable memory device, so as to enhance the convenience of use.

Those skilled in the art will readily observe that numerous modifications and alterations of the device and method may be made while retaining the teachings of the invention.

What is claimed is:

1. A method of converting a transport stream into a file, for storing television program data carried by the transport stream, the method comprising:
   receiving the transport stream;
   performing filtering and depacketizing processes on the transport stream according to a plurality of packet identifiers (PID) of television programs to be stored to generate a plurality of Elementary Streams (ES) and Presentation Time Stamps (PTS) corresponding to each data unit of the plurality of elementary streams; and
   converting the plurality of elementary streams to the file according to the presentation time stamps.

2. The method of claim 1, wherein the step of converting the plurality of elementary streams to the file according to the presentation time stamps comprises:
   generating a file header and corresponding frame headers and sorting each data unit of the plurality of elementary streams according to the presentation time stamps to generate a plurality of data payloads; and
   outputting the file header, the plurality of data payloads and the corresponding frame headers to form the file.

3. The method of claim 2, wherein the step of generating the file header comprises generating the file header according to a selected file format, wherein the selected file format comprises file formats of Audio Video Interleaving (AVI), Advanced Systems Format (ASF) and Motion Picture Expert Group (MPEG).

4. The method of claim 2 further comprising:
   stopping outputting data of the file according to a control signal and generating a file ender of the file.

5. The method of claim 1, wherein the plurality of elementary streams comprises a video elementary stream and an audio elementary stream.

6. The method of claim 1, wherein the step of performing the filtering and depacketizing processes on the transport stream to generate the plurality of Elementary Streams comprises:
   generating a subtitle Packetized Elementary Stream (PES) corresponding to the plurality of Elementary Streams.

7. The method of claim 6 further comprising:
   decoding the subtitle Packetized Elementary Stream to generate a corresponding string; and
   multiplexing the string to the plurality of data payloads according to the Presentation Time Stamps.

8. The method of claim 1 further comprising:
   storing the file into a file storage device.

9. The method of claim 8, wherein the file storage device is a removable storage device.

10. An electronic device for converting a transport stream into a file, for storing television program data carried by the transport stream, the electronic device comprising:
    a reception terminal for receiving the transport stream;
    a filtering unit, coupled to the reception terminal, for performing filtering and depacketizing processes on the transport stream according to a plurality of packet identifiers (PID) of television programs to be stored to generate a plurality of Elementary Streams (ES) and Presentation Time Stamps (PTS) corresponding to each data unit of the plurality of elementary streams;
    a file wrapping unit, coupled to the filtering unit, for converting the plurality of elementary streams to the file according to the presentation time stamps; and
    an output terminal, coupled to the file wrapping unit, for outputting the file.

11. The electronic device of claim 10, wherein the file wrapping unit further generates a file header and corresponding frame headers, sorts each data unit of the plurality of elementary streams according to the presentation time stamps to generate a plurality of data payloads, and outputs the file header, the plurality of data payloads and the corresponding frame headers to form the file.

12. The electronic device of claim 11 further comprising:
    a file header generator for generating the file header according to a selected file format;
    wherein the selected file format is capable of being Audio Video Interleaving (AVI), Advanced Systems Format (ASF) and Motion Picture Expert Group (MPEG).

13. The electronic device of claim 11, wherein the file wrapping unit further stops outputting data of the file according to a control signal and generates a file ender of the file.

14. The electronic device of claim 10, wherein the plurality of elementary streams comprises a video elementary stream and an audio elementary stream.

15. The electronic device of claim 10, wherein the filtering unit further generates a subtitle Packetized Elementary Stream (PES) corresponding to the plurality of Elementary Streams.

16. The electronic device of claim 15 further comprising:
    a subtitle decoder, coupled to the filtering unit, for decoding the subtitle Packetized Elementary Stream to generate a corresponding string;
    wherein the file wrapping unit further multiplexes the string to the plurality of data payloads according to the Presentation Time Stamps.

17. The electronic device of claim 10, wherein the output terminal outputs the file to a file storage device for storing the file.

18. The electronic device of claim 17, wherein the file storage device is a removable storage device.

19. A digital television reception device having a television recording function, the digital television reception device comprising:
    a television receiver, for receiving a digital television signal to generate a transport stream;
    a stream to file converter, coupled to the television receiver, for converting the transport stream to a file for storing television program data carried by the transport stream, the stream to file converter comprising:
       a filtering unit, for performing filtering and depacketizing processes on the transport stream according to a plurality of packet identifiers (PID) of television programs to be stored to generate a plurality of Elementary Streams (ES) and Presentation Time Stamps (PTS) corresponding to each data unit of the plurality of elementary streams; and
       a file wrapping unit for converting the plurality of elementary streams to the file according to the presentation time stamps; and
    a file storage device, coupled to the stream to file converter, for storing the file outputted by the stream to file converter.

20. The digital television reception device of claim 19 further comprises:
    a system clock for activating the television recording function of the digital television reception device at a predetermined time.

21. The digital television reception device of claim 19, wherein the file storage device is a removable storage device.

22. The digital television reception device of claim 21, wherein the file wrapping unit further detects existence of the removable storage device to store the file.

23. The digital television reception device of claim 19, wherein the plurality of elementary streams comprise a video elementary stream and an audio elementary stream.

24. The digital television reception device of claim 19, wherein the filtering unit further generates a subtitle Packetized Elementary Stream (PES) corresponding to the plurality of Elementary Streams.

25. The digital television reception device of claim 24, wherein the stream to file converter further comprises:
  a subtitle decoder, coupled to the filtering unit, for decoding the subtitle Packetized Elementary Stream to generate a corresponding string;
  wherein the file wrapping unit further multiplexes the string to the plurality of data payloads according to the Presentation Time Stamps.

26. The digital television reception device of claim 19, wherein the stream to file converter further comprises:
  a file header generator for generating a file header according to a selected file format;
  wherein the file format is capable of being Audio Video Interleaving (AVI), Advanced Systems Format (ASF) and Motion Picture Expert Group (MPEG).

27. The digital television reception device of claim 19, wherein the file wrapping unit further stops outputting data of the file according to a control signal and generating a file ender of the file.

* * * * *